April 16, 1963   B. L. GARBIG   3,085,383
AIR CLEANER ADAPTER
Filed Sept. 19, 1960   2 Sheets-Sheet 1

INVENTOR.
BILLY L. GARBIG
BY
Toulmin & Toulmin
ATTORNEYS

INVENTOR.
BILLY L. GARBIG
BY
Toulmin & Toulmin
ATTORNEYS

United States Patent Office 3,085,383
Patented Apr. 16, 1963

3,085,383
AIR CLEANER ADAPTER
Billy L. Garbig, R.R. 1, Greenville, Ohio
Filed Sept. 19, 1960, Ser. No. 56,773
1 Claim. (Cl. 55—504)

This invention relates to engines and is particularly concerned with an air cleaner arrangement for an engine and more particularly still is concerned with an adapter arrangement adapted for permitting the mounting of an air cleaner unit on the carburetor of an engine such as a lawn mower engine.

Most internal combustion lawn mower engines are provided with a cleaner attached to the air inlet of the carburetors and generally these cleaners are in the form of cups in which oil is placed and through which the air drawn into the engine passes so that dirt and dust in the air is entrapped in the oil. Such cleaners are fairly efficient but have the disadvantage of being messy and having the oil spill out.

A particular disadvantage of a filter of this nature is that tilting of the mower will spill out the oil and a tendency of a careless operator is to permit the filter to become dry whereupon it has no air cleaning action whatsoever. This, of course, is very injurious to the engine which takes in a great amount of dust and dirt, particularly, on account of the fact that it is positioned close to the ground and is often worked in regions where the mower itself stirs up considerable dust and dirt.

Heretofore, so far as it known to me, there has been no other type of filter unit available for gasoline engines of the nature put on power lawn mowers or the like and it is accordingly a primary object of the present invention to provide an inexpensive adapter fitting that can be connected to the carburetor of most types of engines of this nature and which adapter fitting will permit an inexpensive dry filter or cleaner to be mounted on the engine.

Another object of this invention is the provision of the adapter of the nature referred to in which will be sealed tightly to the carburetor inlet and which will sealingly receive the filter unit so that all air drawn into the engine through the carburetor will be cleaned by the air filter.

A still further object is the provision of an adapter for an air cleaner which can be manufactured quickly and inexpensively with a minimum amount of tooling being required.

A still further object is the provision of an adapter fitting which can be used on most types of carburetors or which can be slightly modified as to structure to adapt it to other types of carburetors thereby making available the advantages of the dry air cleaner to practically all small gasoline engines.

These and other objects and advantages of the present invention will become more apparent upon reference to the following specification taken in connection with the accompanying drawings in which.

Figure 1:
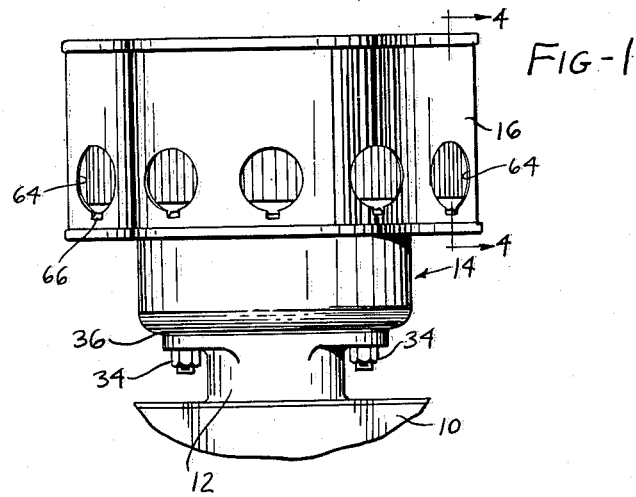
FIGURE 1 is a fragmentary elevation view showing an air cleaner and an adapter therefore according to this invention mounted on the inlet of a carburetor.

Referring to the drawing somewhat more in detail in FIGURE 1, 10 represents a carburetor having an air inlet member 12 through which air is drawn into the carburetor. Mounted on top of the air inlet member 12 is adapter fitting 14 according to this invention which threadedly receives the air filter 16. This air filter is of a dry type, having no oil therein, and may, for example, consist of a pleated porous paper filtering element which can be cleaned by shaking or rapping the filter and which is inexpensive enough to be thrown away after season's use if necessary.

Figure 2:
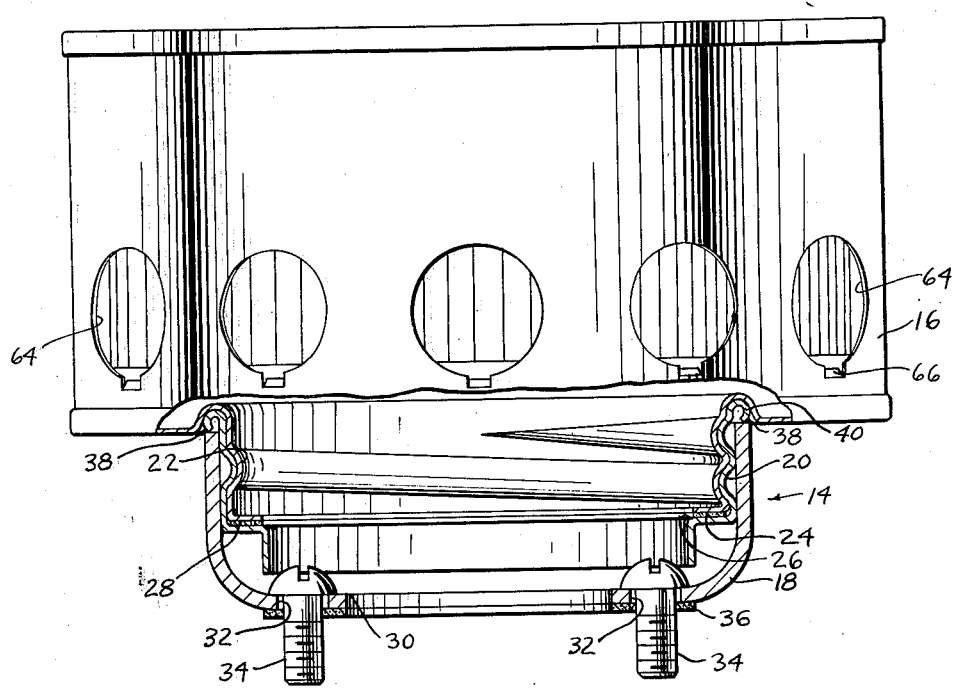
FIGURE 2 is a view drawn at a greatly increased scale showing the adapter in cross-section.

In FIGURE 2 it will be noted that the adapter member 14 comprises a metal cup element 18 of fairly heavy wall section and disposed within the cup element 18 is a thin insert element 20 having threads rolled therein adapted for threadedly receiving the projecting exit neck 22 of the filter 16. The threaded insert 20 is shouldered as at 26 toward the bottom so that it can be abutted by the shoulder 24 at the bottom of neck 22. A gasket 28 may be disposed between the shoulders if so desired.

The cup 18 extends downwardly beyond the insert 20 and is centrally apertured as at 30 for communication with the passage in inlet member 12, other apertures 32 are provided at the bottom of the cup for receiving the screws 34 by means of which the air adapter member is attached to inlet member 12, there being a sealing gasket 36 disposed between the adapter member and the upper face of the inlet member. It will be noted that the cup is deep enough that the heads of screws 34 will not interfere with the passage of air through the adapter member or with the insert 20.

Figure 3:
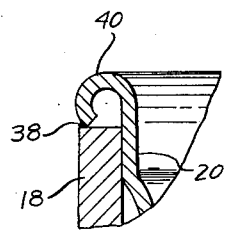
FIGURE 3 is a fragmentary view showing the manner in which the cup of the adapter is fixedly attached to a threaded insert located in the adapter.

The insert 20 is adapted for being attached as by welding or brazing or silver soldering. The brazing or silver soldering, either one, is capable of being accomplished in a furnace. As will be seen in FIGURE 3 the wall of cup 18 is joined to the upper arcuate rim portion 40 of the threaded insert member 20 by metal 38 which connects the two by means of a fusion process such as the welding, brazing, or silver soldering referred to above.

The described arrangement is efficient and inexpensive and permits the advantages of a dry air cleaner to be brought to substantially any small internal combustion gasoline engine.

It has been found that the vibration of small engines, such as power mower engines, tend to loosen the dry filter element in the filter so that air can pass through the filter element without being filtered. I have found that this can be effectively prevented in a simple manner.

Figure 4:
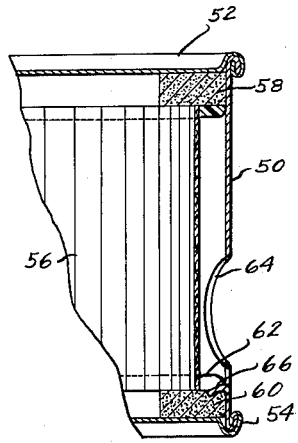
FIGURE 4 is a vertical sectional view indicated by line 4—4 on FIGURE 1.

Reference to FIGURE 4 will show that the filter comprises an outer metal shell 50 with top and bottom caps 52 and 54 attached thereto. Between the top and bottom caps extends the corrugated porous paper filter element 56. The opposite ends of the filter element engage the felt rings 58 and 60 and are attached thereto by an adhesive material 62. The outer shell 50 has air inlet apertures 64 which, in the filter illustrated, are located adjacent the bottom of the filter shell.

In order to clamp the filter element within the filter housing, I crimp the shell inwardly at the bottom of several or all of the apertures 64 as indicated at 66. This can be done by clamping the shell inwardly with a pair of pliers and I have found that this effectively prevents the filter element from vibrating loose and becoming ineffective on account of vibration of the filter unit.

Other means of attaching the filter element within the casing can be employed, for example, by attaching one or both of the felt rings, such as pins extending through the rings and end members of the filter, or by a suitable resilient adhesive material connecting the felt rings with the housing of the filter unit.

Figure 5:
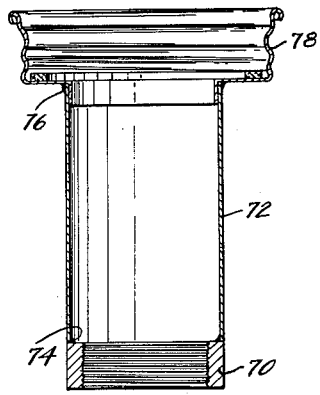
FIGURE 5 is a longitudinal sectional view through a modified arrangement of the present invention.

The adapter described in detail above is adapted for fairly general usage with a large class of carburetors but it will be appreciated that there are other types of carburetor inlets that would require different members between the threaded element that receives the threaded neck of the filter and the carburetor inlet. One such device is illustrated in FIGURE 5. This device is adapted for use on a carburetor having a threaded inlet. The threaded carburetor inlet is receivable in threaded ring 70 which is connected to a tube 72 as by silver soldering 74.

Tube 72, in turn, is connected by silver soldering 76 with threaded member 78 which is the same as threaded member 20 in the first described modification.

It will also be evident that the adapter of the present invention permits the filter to be located at any angle and does not require that it be disposed vertically as is necessarily the case with an oil filled filter.

Certain known type carburetors, particularly those having oil filled filters thereon, have a rod upstanding from the inlet to which the oil filled filter is attached.

Figure 6:
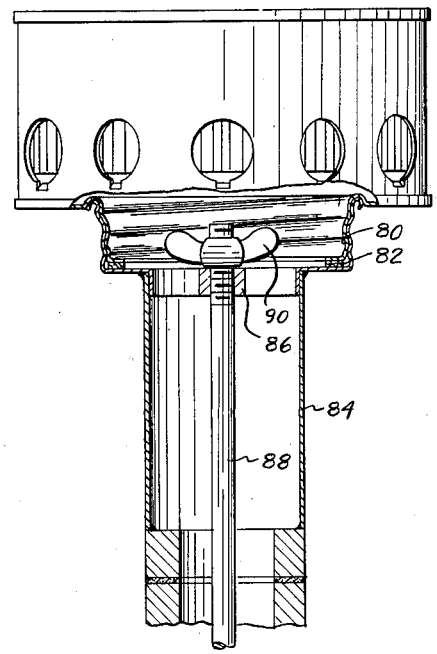
FIGURE 6 is a view showing still another type of adapter member according to the present invention.

FIGURE 6 shows more or less diagrammatically an adapter according to the present invention that could be employed with a carburetor of this nature. The adapter comprises the threaded member 80 which is the same as the threaded member 20 in the first modification and 78 in the second modification and attached thereto by silver soldering 82 is a tubular portion 84 adapted to bear against the carburetor inlet.

Tubular element 84 has therein a bridge element 86 through which the rod 88 for supporting the oil filled filter element extends. Wing nut 90 clamps with adapter member in place and a dry filter according to the present invention can be employed.

It will be understood that this invention is susceptible to modification in order to adapt it to different usages and conditions; and, accordingly, it is desired to comprehend such modifications within this invention as may fall within the scope of the appended claim.

I claim:

The combination of a dry air filter and an adapter member for coupling the filter to the air inlet of an internal combustion engine, said filter having an externally threaded exit neck with a downwardly facing shoulder at its free end, said adapter comprising a cup with a large central aperture and a plurality of smaller apertures in its bottom end, and an internally threaded liner fitted closely against the inner wall of the cup and adapted to receive the threaded exit neck of the filter, said liner having an inwardly projecting flange adapted to be abutted by the end of the exit neck, the internal diameter of the flange being larger than the diameter of the apertured portion of the cup so as to permit attachment and removal of the cup from said internal combustion engine inlet without removal of the liner therefrom.

References Cited in the file of this patent

UNITED STATES PATENTS

| | | |
|---|---|---|
| 738,503 | Waters | Sept. 8, 1903 |
| 928,710 | Svagell | July 20, 1909 |
| 1,513,036 | Donaldson | Oct. 28, 1924 |
| 1,955,354 | Winslow | Apr. 17, 1934 |
| 1,983,866 | Mikulasek | Dec. 11, 1934 |
| 2,122,111 | Poelman et al. | June 28, 1938 |
| 2,603,308 | McCall | July 15, 1952 |
| 2,672,214 | Goodloe | Mar. 16, 1954 |